A. Bisbee.

Steam Gauge Cock.

No. 4,027. Reissued Jun. 14, 1870.

United States Patent Office.

OSCAR T. EARLE, OF NORWALK, CONNECTICUT, ASSIGNEE OF ALBERT BISBEE.

*Letters Patent No.* 13,563, *dated September* 18, 1855; *extended seven years; reissue No.* 4,027, *dated June* 14, 1870.

IMPROVEMENT IN STEAM-GAUGE COCKS.

The Schedule referred to in these Letters Patent and making part of the same.

*To all whom it may concern:*

Be it known that ALBERT BISBEE, of Chelsea, in the county of Suffolk and State of Massachusetts, invented certain new and useful Improvements in Stop-Cocks, and that the following, taken in connection with the drawing, is a full, clear, and exact description thereof.

In the drawing—

Figure 1:
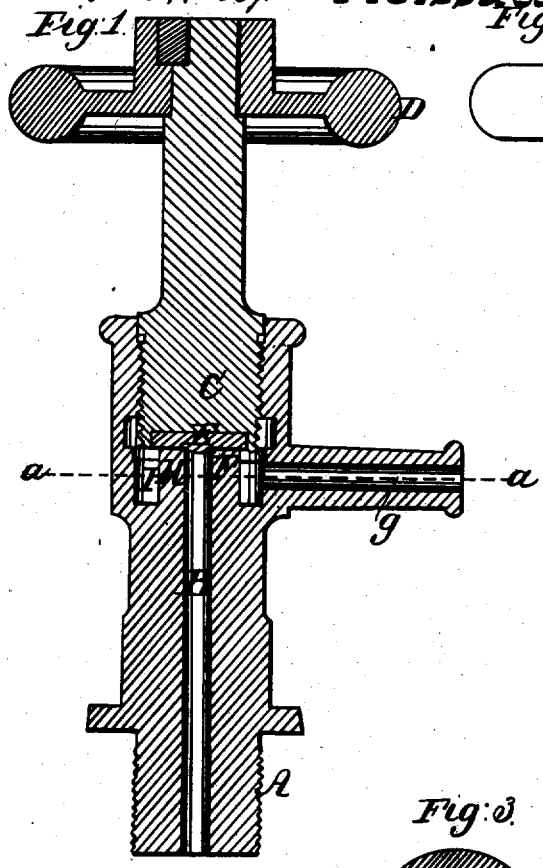
Figure 1 is a longitudinal section through a stop-cock.
Figure 2:
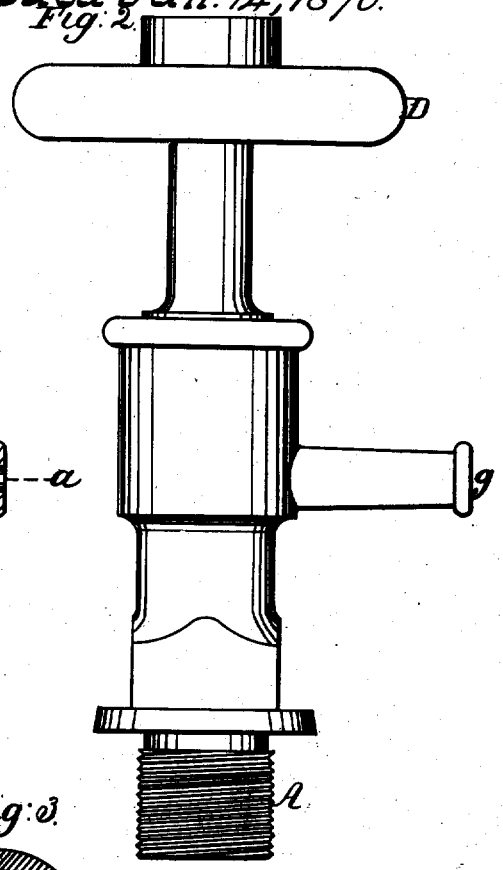
Figure 2 is an elevation thereof.
Figure 3:
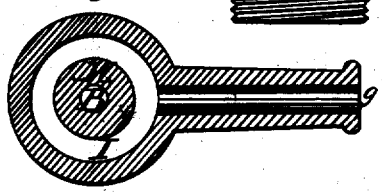
Figure 3 is a cross-section on the line *a a* of fig. 1.
Figure 4:
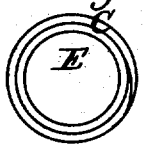
Figure 4 is an end view of the screw-plug or stopper.

In ordinary stop-cocks with metallic faces for the valve or stopper and seat, and in which the valve and seat approach and recede to and from each other, as the cock is shut and opened, great difficulties arise in keeping them tight, and these difficulties, the causes of which are well known, are especially noticeable in gauge-cocks for steam-boilers and stop-cocks for hot and dirty water.

The improvements of the said ALBERT BISBEE are chiefly applicable to gauge-cocks, but are useful in cocks for other purposes, and consist, first, in making one of the surfaces that meet to close the water-way or steam-passage of a piece of vulcanized rubber, which is protected from spreading, or confined in metal in such manner that but little more than its bearing or acting surface is exposed; and, second, in combining with this surface another surface of metal, which is annular, so that the rubber may be compressed by the same power more forcibly than if the metal surface were equal in area to that of the rubber.

In the drawing the body of the stop-cock and its screw are shown at H, the stopper at C, provided with a hand-wheel, D, and also with a screw, which is screwed into a nut formed by preference in the body of the cock.

The water or steam-passage is represented at B *g* and the annular seat at F.

This metallic annular surface is surrounded by an annular chamber, I, and the India rubber is shown at E.

This vulcanized rubber is in the preferred form, a disk seated in an annular chamber formed upon the the end of the stopper C, and, by reference to the drawing, it will be perceived that it is protected by metal on all sides, except that which forms the bearing-surface.

The back and rim of the rubber are thus protected from grit and dirt, from being cut by any substances lodging in the valve-chamber, and from being spread out under the joint influence of heat and pressure on the latter only; and, further, when the rubber is thus protected, a tight joint may be made by less motion and pressure than if the rubber were an unprotected disk. This protection of the disk is, therefore, important in the working of the contrivance, and, moreover, when the metal is so shaped as to protect the rubber, it also serves to hold it in place.

By further reference to the drawing, it will be perceived that the annular seat imbeds itself, to a certain extent, in the rubber, causing the rubber to expand toward the seat, both on the interior and the outer circular edge thereof, thus securing a tighter joint than if the seat were a plain or conical surface with a central hole only, as is usually the case with stop-cocks. This annular seat, moreover, is more easily cleaned than those ordinarily employed.

I claim as the invention of the said ALBERT BISBEE—

1. A piece of vulcanized rubber, combined with metal, so as to be protected by metal on all sides, except the bearing surface, and forming one of the surfaces which, when in close contact, close the passage through the stop-cock.

2. In combination with a piece of vulcanized rubber, protected as described, an annular metallic surface, the two, when in close contact, closing the aperture or passage through the stop-cock, substantially in the manner described.

OSCAR T. EARLE.

Witnesses:

ALFRED H. CAMP,

HENRY K. SELLECK.